Feb. 16, 1971   F. C. HAYDEN   3,562,845
LITTER REMOVAL APPARATUS
Filed Sept. 16, 1968   2 Sheets-Sheet 1
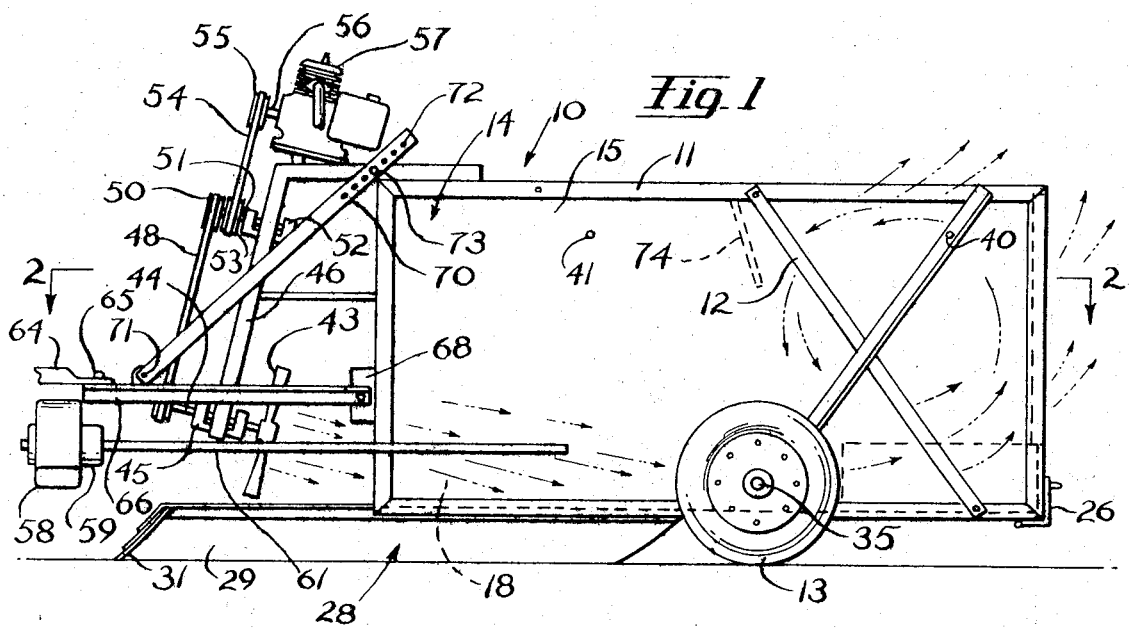
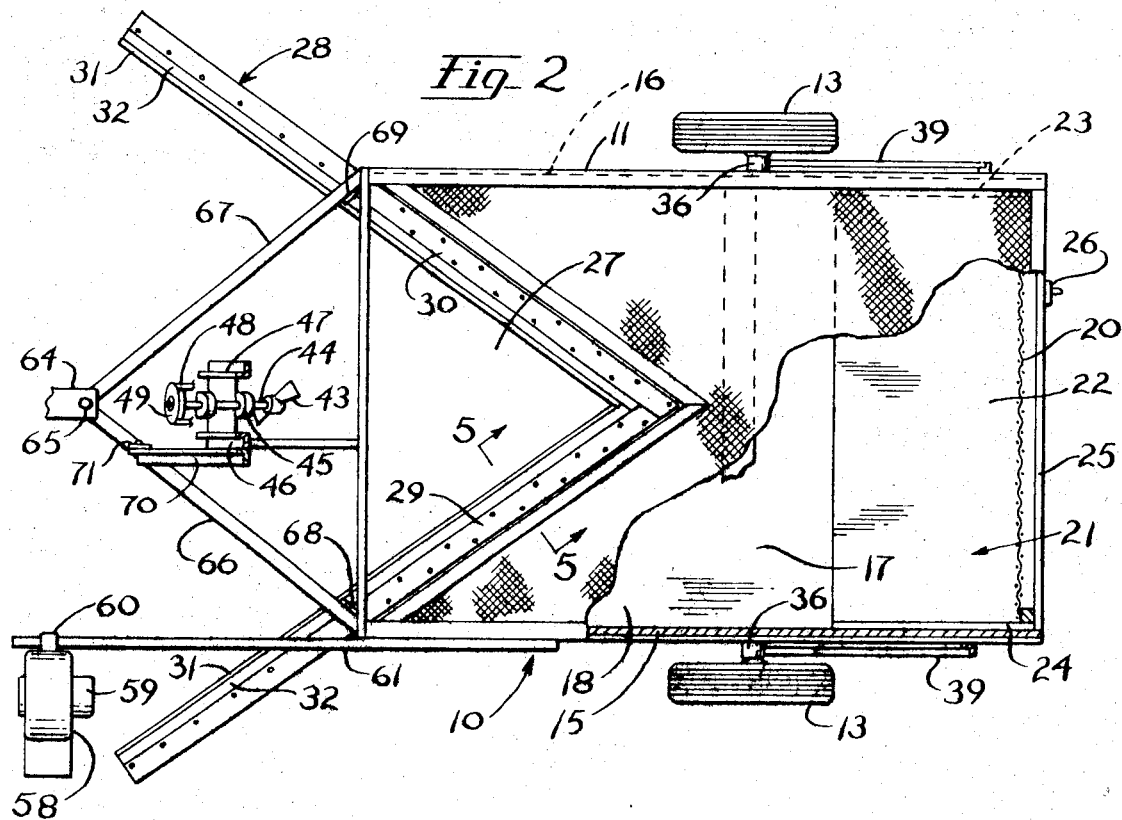
INVENTOR.
Fred C. Hayden
BY
Gardner & Zimmerman
Attorneys Feb. 16, 1971     F. C. HAYDEN     3,562,845
LITTER REMOVAL APPARATUS
Filed Sept. 16, 1968     2 Sheets-Sheet 2
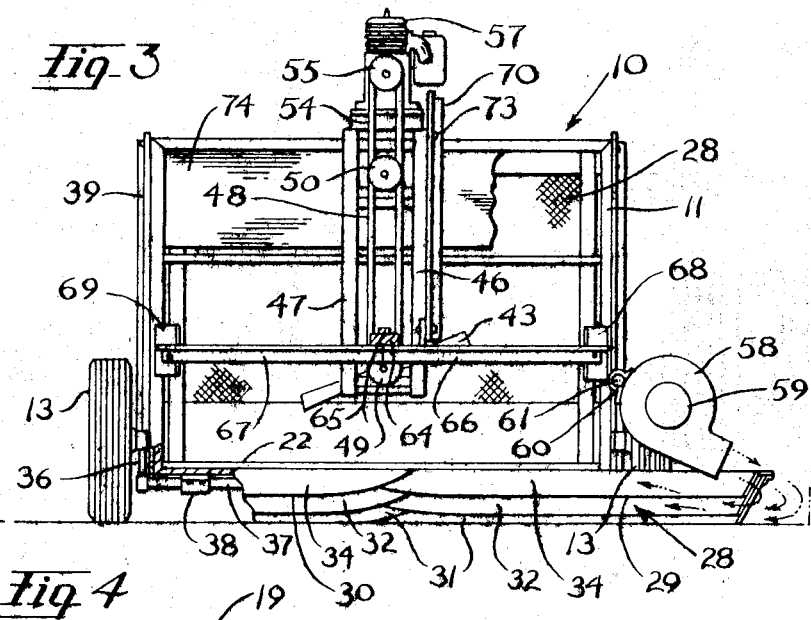
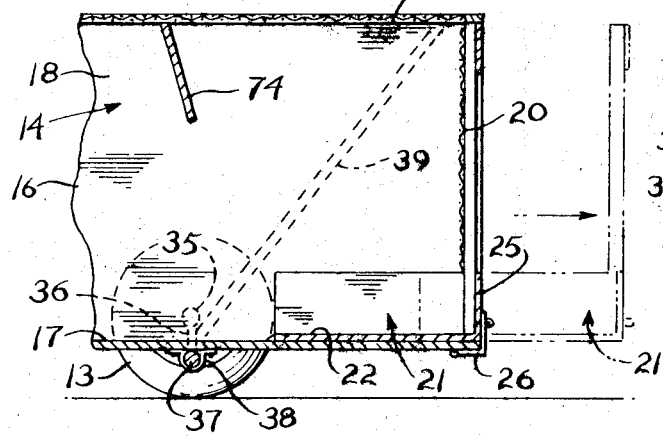
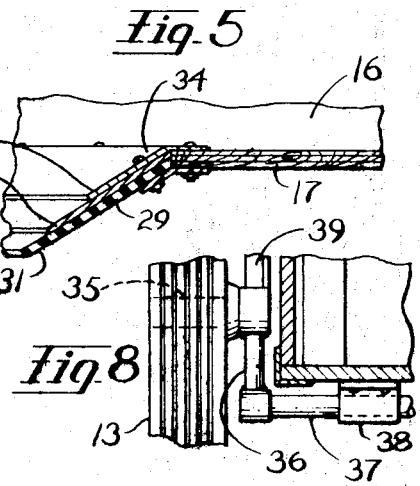
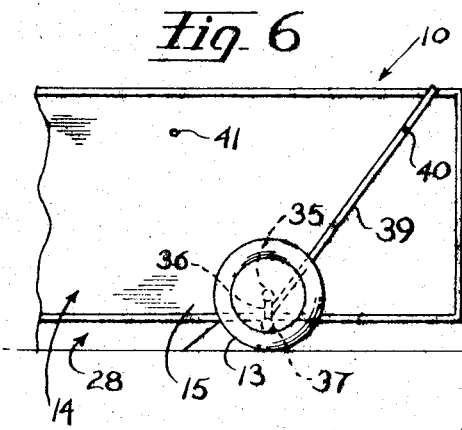
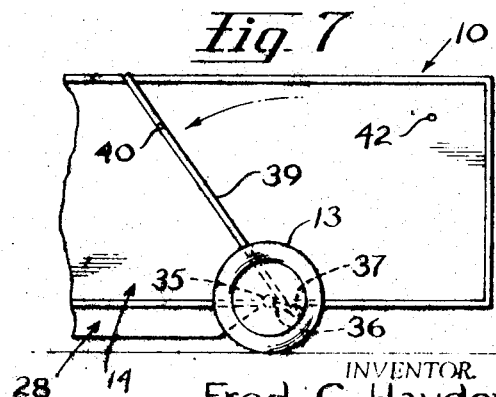
INVENTOR
Fred C. Hayden
BY
Gardner & Zimmerman
Attorneys United States Patent Office 3,562,845
Patented Feb. 16, 1971

3,562,845
LITTER REMOVAL APPARATUS
Fred C. Hayden, 7785 Yorkshire Drive,
Reno, Nev. 89503
Filed Sept. 16, 1968, Ser. No. 762,228
Int. Cl. E01h 1/08
U.S. Cl. 15—347                                  7 Claims

ABSTRACT OF THE DISCLOSURE

Apparatus for and method of removing litter from parking lots, streets and similar areas. The apparatus constitutes a wheel-equipped vehicle adapted to be propelled along the surface of such area, and includes a frame having a casing mounted thereon which defines a relatively large enclosure therewithin. Accumulator structure in the form of two forwardly diverging collector members sweeps along such surface as the apparatus traverses the same and directs litter toward a restricted location at the vertex of the members. A blower at the forward end of the apparatus moves a stream of air toward such restricted location to pick up and carry litter accumulated thereat into the enclosure from which the air escapes through screened outlets that retain the litter within the enclosure. The method includes the steps of accumulating litter from a relatively compact surface into a restricted location therealong, providing an air stream and directing the same toward such location to carry litter thereat toward a receptacle, passing the litter-carrying air through the receptable, and within the receptacle extracting litter from the air passing therethrough.

---

This invention relates to apparatus for and a method of removing litter from relatively compact surfaces such as those found in parking lots, on streets and along similar areas, and it relates more particularly to apparatus in the form of a wheel-equipped vehicle adapted to traverse such surface in removing litter therefrom.

Many different mechanisms are in use for removing litter from parking lots, streets and similar areas having relatively compact surfaces therealong; and, in general, such mechanisms take one of two variant forms or constitute a combination thereof. In this respect, one such form uses rotatable brooms or brushes to engage the surface and sweep litter therefrom into a receptacle, and another such form uses a vacuum or suction developed at an inlet opening close to the surface to draw litter therefrom and into a receptacle within the mechanism. In some instances, a combination of the sweeper brushes and vacuum mechanisms are employed.

An object of the present invention is to provide an improved apparatus for removing litter from relatively compact surface areas such as the concrete or asphalt surface coverings of parking lots, roadways, etc.

Still another object of the invention is that of providing an improved apparatus for litter removal in which litter is accumulated at restricted locations along a surface upon which it has been strewn by means of accumulator structure carried by a wheel-equipped frame propelled along such surface and which accumulator structure directs litter toward such restricted location, in which a positive-pressure air stream developed by a blower mechanism is directed toward such location to pick up litter thereat and accelerate or carry the same toward a receptacle, and in which the air is passed through the receptacle or enclosure thereof within which litter is extracted from the air prior to its escape through discharge openings provided for this purpose.

Additional objects and advantages of the invention, especially as concerns particular features and characteristics thereof, will become apparent as the specification describes the specific embodiment of the invention illustrated in the accompanying drawings, in which:

FIG. 1 is a side view in elevation of apparatus embodying the invention;

FIG. 2 is a longitudinal sectional view taken along the line 2—2 of FIG. 1;

FIG. 3 is a front view in elevation (looking from left to right in FIG. 1) of the apparatus;

FIG. 4 is a broken longitudinal sectional view of the rear end portion of the apparatus;

FIG. 5 is an enlarged, broken transverse sectional view taken along the line 5—5 of FIG. 2;

FIG. 6 is a essentially a diagrammatic view of a portion of the apparatus showing the operative position thereof relative to a surface to be cleaned thereby;

FIG. 7 is a diagrammatic view similar to that of FIG. 6, but showing the elevated or inoperative position of the apparatus; and FIG. 8 is a broken vertical sectional view of the axle and wheel support structure.

The litter removal apparatus shown in the drawings is a wheel-equipped vehicle adapted to be propelled along a relatively compact surface from which litter is to be removed. The apparatus as illustrated is adapted to be propelled or towed by a truck or similar motorized vehicle, but quite apparently it could be a self-propelled vehicle. The apparatus is designated in its entirety with the numeral 10, and comprises frame structure 11 that includes a plurality of elongated channels or L-shaped frame members welded or otherwise rigidly secured to each other, and such frame members may be reinforced wherever necessary as by crossed bracing 12 shown in FIG. 1. The frame structure 11 is provided with tire-equipped wheels 13 for rollingly supporting the apparatus 10 upon a surface to be cleaned thereby.

A casing 14 is mounted upon the frame structure 11, and it includes upwardly extending side walls 15 and 16 and a bottom wall 17 together defining a relatively large enclosure or receptacle 18. The enclosure 18 is open at its forward end to admit air and litter thereinto, and it is provided along the top thereof with screen structure 19 (FIG. 4) through which are can escape but which is effective to confine litter within the enclosure. The rear end of the enclosure 18 is also provided with screen structure 20 forming a part of a bin 21 removably supported within the casing 14 adjacent the rear thereof.

In this respect, and as shown best in FIG. 2 and 4, the bin 21 has a bottom wall 22, relatively short side walls 23 and 24 extending upwardly therefrom, and a similarly short rear wall 25 also extending from the bottom wall 22. Thus, the lower end portion of the bin 21, which is open at the forward inner end thereof, provides a relatively imperforate receiver for debris and is removable from the enclosure 18 for purposes of being emptied. The screen structure 20 extends upwardly from the bin 21 to adjacency with the screen structure 19 forming the top wall of the enclosure and permits the escape of air rearwardly therefrom while confining debris therewithin. Latch structure 26 may be incorporated in the apparatus to assure positive retention of the bin 21 within the container 14. Such latch structure 26 may take any conventional form as, for example, an L-shaped latch hinge pivotally secured to the bottom wall 17 of the casing and a U-shaped eye projecting rearwardly from the bin 21 which is adapted to pass through an opening provided therefor in the latch hinge and is adapted to receive a pin by means of which the latch hinge is constrained in the locking position thereof shown in FIGS. 1, 2 and 4.

As shown most clearly in FIG. 2, the bottom wall 17 of the casing 14 has a relatively large V-shaped opening 27 formed at the forward end thereof, and associated with such opening 27 is accumulator structure, generally denoted with the numeral 28, operative to direct litter toward a restricted location adjacent the open end of the enclosure 18, and which restricted location is generally defined by the vertex of the opening 27. The accumulator structure is formed by a pair of angularly disposed collector members 29 and 30 that respectively extend along the edges of the opening 27 and coverge inwardly and rearwardly toward the vertex thereof and, therefore, toward the rear of the apparatus 10. The collector members 29 and 30 also diverge forwardly from the casing 14 and project forwardly and transversely from the vehicle beyond the outer extremities of the wheels 13 thereof, as shown best in FIG. 2, so as to define a relatively large mouth through which litter is swept inwardly toward the restricted location at the vertex of the opening 27.

The members 29 and 30 are substantially identical; and as shown best in FIG. 5 which illustrates the member 29, it includes a relatively flexible component or seal member 32 which may be formed of a fibrous rubberized material such as belting that extends downwardly and inwardly from the bottom wall 17 and at its lower end is adapted to be disposed in substantially contiguous relation with the surface to be cleaned by the apparatus during operation thereof. The component 31 is relatively flexible so as to accommodate bumps and other irregularities encountered along any surface, and it is maintained in the inclined disposition shown by a hold-down plate or stiffener 32. The seal member 31 and stiffener 32 are fixedly related to the bottom wall 17 by clamp structure in the form of a lower bracket 33 underlying a part of the floor wall 17 and seal 31 and an upper bracket 34 overlying a part of the floor wall 17 and stiffener 32, and which brackets are clamped to the floor and the seal member and stiffener by means of bolts, as shown.

The lower edges of the seal members 31 respectively provided by the angularly disposed collector members 29 and 30 are adapted to be lowered (as shown in FIG. 6) into proximity with a surface to be cleaned of litter by the apparatus 10 during operation thereof, and to be elevated (as shown in FIG. 7) above such surface so as to prevent wear when the apparatus is not in operation. In the particular apparatus being considered, such raising and lowering of the seal members is accomplished by selectively raising and lowering the frame structure 11 and casing 14, together with all of the components respectively supported by the frame structure and casing, relative to the wheels 13. More particularly in this respect, each wheel 13 is journalled for rotation upon a stub shaft or axle 35 extending laterally outwardly from one end of a crank arm 36 which at its other end is secured to a pivot shaft 37 that extends transversely across the frame structure 11 and is pivotally supported therebelow by a plurality of transversely spaced bearings 38.

Each of the crank arms 36, respectively disposed along opposite sides of the apparatus, has a lever arm 39 extending angularly therefrom to provide a means by which the crank arms (and axles 35 projecting laterally outwardly therefrom) are pivoted or swung about the axis of the pivot shaft 37. Referring to FIGS. 6 and 7, it will be seen that the lever arms 39 are selectively movable in a counter-clockwise direction from the position shown in FIG. 6 to the position illustrated in FIG. 7, and vice versa; and the lower arms can be locked in either position by any suitable means as, for example, a pin 40 extending through an opening provided therefor in the lever arm and into one or the other of a pair of openings 41 and 42 provided by the casing 14.

It will be appreciated that since the vertical position of each axle 35 is determined by the diameter of the wheel 13, there is no way to raise and lower such axles relative to any surface supporting the wheels 13. Accordingly, when the lever arm 39 are angularly displaced in a counter-clockwise direction from the position shown in FIG. 6 and into the position shown in FIG. 7, the consequent angular displacement of the crank arms 36 and pivot shaft 37 fixedly secured thereto must raise the entire frame structure 14 and casing 15 of the apparatus, thereby elevating the accumulator structure 28 and seal members 31 thereof above such support surface. Angular displacement of the lever arms 39 in the opposite direction will necessarily result in a reverse displacement of the frame structure and casing, thereby lowering the seal members 31 into substantially contiguous relation with the surface supporting the apparatus thereon. Movement of the lever arms 39 is intended to be effected manually in the apparatus 10.

Mounted upon the frame structure 11 of the apparatus is blower mechanism comprising a fan or propeller 43 constrained upon a shaft 44 journalled for rotation in U-shaped bearing structure 45 rigidly attached to a pair of inverted, somewhat L-shaped brackets 46 and 47 welded or otherwise rigidly secured to the frame structure 11 of the apparatus. As shown most clearly in FIG. 1, the fan 43 is disposed at an elevation somewhat above the floor 17 of the compartment 18, and the shaft 44 is oriented so as to be inclined downwardly and rearwardly wherefore the air stream delivered by the fan 43 is directed toward the aforementioned restricted location adjacent the vertex of the opening 27 and collector members 29 and 30 so as to carry litter and other debris located thereat into the enclosure 18.

The fan shaft 44 is rotatably driven by an endless belt 48 entrained at one end about a sheave or pulley wheel 49 mounted upon the shaft 44, and entrained at its other end about a sheave 50 mounted upon an idler shaft 51 journalled for rotation in bearing structure 52 supported by the aforementioned brackets 46 and 47. Also mounted upon the shaft 51 is a pulley wheel 53 having an endless belt 54 entrained thereabout that is also entrained about a sheave or pulley wheel 55 mounted upon the output shaft 56 of a prime mover 57, which in the form shown is a gasoline powered internal combustion engine, but it will be apparent that other forms of prime mover might be used as, for example, an electric motor. The engine 57 is mounted upon the aforementioned brackets 46 and 47.

An auxiliary blower 58 is provided along one side of the apparatus, and it is a centrifugal blower driven by motor means in the form of an electric motor 59. The blower 58 is equipped with a clamp 60 mounted upon an elongated rod 61 welded or otherwise fixedly secured to the frame structure 11 and casing 14 of the apparatus. The rod 61 is horizontally disposed and projects forwardly beyond the casing 14 and beyond the accumulator structure 28, as shown in FIGS. 1 and 2. The clamp 60 is adjustably positionable along the rod 61 so that in use of the apparatus 10 and blower 58, the blower is moved forwardly along the shaft 61 and is locked in place, by tightening the clamp 60, at a position forwardly of the accumulator structure 28. When not in use, the blower 58 may be displaced rearwardly to a position closer to the casing 14.

As may be observed in FIG. 3, the blower 58 is oriented so that the air stream delivered thereby angles downwardly and transversely so as to impinge along any curbing or berm 62 provided along the surface 63 to be cleared of litter by the apparatus 10. Such air delivery by the blower 58 causes any litter adjacent the curb 62 to be blown therefrom into a location at which it can be swept inwardly and directed by the accumulator structure 28 toward the vertex of the opening 27 as the apparatus 10 is propelled along the surface 63. As indicated hereinbefore, the particular apparatus shown is intended to be towed by a power driven vehicle equipped with a towing tongue 64 adapted to be releasably connected with a hitch pin 65 provided by the apparatus. The pin 65 extends upwardly from a pair of forwardly converging arms 66 and 67 that at the rear ends thereof are pivotally supported, respectively, on pins provided therefor by mounting plates 68 and 69 fixedly secured to the frame structure 11 of the apparatus.

The arms 66 and 67 are swingable about the pivot pins supporting the same so as to selectively raise or lower the hitch pin 65 to the elevation required for connection thereof with the tongue 64 of any particular towing vehicle; and the arms are constrained in any position of vertical adjustment by a strap 70 pivotally secured at the lower end thereof (as shown at 71) to the arm 66, and provided at its upper end with a plurality of spaced apart apertures 72 adapted to pass a pin 73 therethrough which projects into an opening therefor provided by the bracket 46. Evidently, the arms 66 and 67 can be raised or lowered depending upon which opening 72 is selected for connection by the pin 73 with the bracket 46.

In operation of the apparatus 10, it is connected to the tongue 64 of a towing vehicle after the elevation of the hitch pin 65 is adjusted to the height required by such tongue, as heretofore described. The blower mechanism comprising the fan 43 is energized by starting the engine 57, whereupon an air stream is developed which is directed downwardly and inwardly into the enclosure 18 and toward the restricted location defined adjacent the vertex of the opening 27 to pick up and entrain or carry litter located thereat into the enclosure 18. The auxiliary blower 58 is positioned at an appropriate location along the rod 61 and is energized by starting the motor 59 whenever it is desired to dislodge litter from along a curbing 62 which otherwise might escape the collection operation of the accumulator structure 28. Evidently, when the auxiliary blower 58 is not required, it can be deenergized. The lever arms 39 are swung rearwardly and into the position shown in FIG. 6 to lower the seal members 31 into proximity with the surface 63, and the apparatus is then in condition for operation.

As the apparatus is towed about a parking lot, or along a street or other relatively hard or compact surface to be cleaned of debris, the accumulator structure 28 sweeps litter in its path inwardly and rearwardly toward the vertex of the opening 27 whereat the air stream provided by the fan 43 lifts such litter upwardly and into the enclosure 18. Very little back-pressure or opposition to free flow of air into and through the enclosure 18 is encountered because both the top wall and rear wall thereof are formed by the screen structures 19 and 20 with the result that air passes freely through the enclosure. However, litter entrained in or carried by the air stream is confined within the enclosure 18 because of the relatively small openings defined by the screen structures, whereby such litter is effectively extracted within the enclosure from the air stream passing therethrough.

It may be observed, particularly in FIG. 1, that the direction of the air stream is generally along the bottom wall 17 of the enclosure, and toward the rear wall thereof at which it tends to impinge against the substantially imperforate rear wall 25 of the removable bin 21. Such rear wall 25 therefore functions in the manner of a baffle to direct the air stream upwardly and to extract litter therefrom by impingement of the litter against the wall. As the air stream moves upwardly, considerable portions thereof flow outwardly through the screen structure 20 and other portions flow outwardly through the screen structure 19. An additional baffle 74 extending transversely across the enclosure 18 adjacent the top wall 19 thereof tends to prevent any air that does not exit from the enclosure 18 adjacent the rear thereof from returning toward the forward end of the enclosure, and also tends to extract any litter still retained in such air by impact of the litter against the baffle.

When ever quantities of litter have been collected within the enclosure 18, and especially within the bin 21 thereof, the bin is simply removed to empty it of litter and then replaced within the enclosure. When not in operation, the accumulator structure 28 is elevated by swinging the lever arms 39 forwardly and into the position shown in FIG. 7, and the auxiliary blower 58 may be moved rearwardly along the rod 61 to a less obtrusive position.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

I claim:

1. Apparatus for removing litter from a relatively compact surface, comprising frame structure equipped with wheels for rollingly supporting said apparatus upon such surface, a casing mounted upon said frame structure and defining a relatively large enclosure therewithin open at its forward end to permit ingress of air and litter thereinto and equipped adjacent its rear end with screen structure effective to retain litter within said enclosure while permitting egress of air therefrom, accumulator structure carried by said apparatus adjacent the forward end thereof for directing litter toward a restricted location adjacent the open end of said enclosure and including a pair of angularly disposed collector members converging inwardly toward the rear of said frame structure and extending downwardly therefrom toward proximity with such compact surface, each of said angularly disposed collector members being equipped with a depending relatively flexible seal adapted to be brought into substantially contiguous relation with such compact surface during operation of said apparatus, means for selectively displacing said frame structure in vertical directions relative to said wheels so as to lower said angularly disposed collector members and bring said seals thereof into such contiguous relation with such compact surface during operation of said apparatus and to elevate said collector members and displace said seals from such compact surface when said apparatus is not in operation, and blower mechanism supported by said frame structure for directing an air stream toward such restricted location to carry litter thereat into said enclosure.

2. The apparatus of claim 1 in which said casing is provided with a bottom wall having a relatively large V-shaped opening therein adjacent the forward end of said enclosure, in which said angularly disposed collector members are located along the edges of said V-shaped opening, the aforesaid restricted location being intermediate said collector members toward the vertex thereof, and in which said blower mechanism is supported above said bottom wall and is angularly disposed with respect to the longitudinal axis of said apparatus so as to direct an air stream downwardly and rearwardly toward the vertex of said V-shaped opening and said angularly disposed collector members extending along the respective edges thereof.

3. The apparatus of claim 1 in which said casing is provided with a rear wall and with a top wall, in which said screen structure comprises a part of each of said rear and top walls, and further comprising baffle means mounted within said enclosure to facilitate release of litter from such air stream by impingement of the litter-entrained air stream with said baffle means.

4. Apparatus for removing litter from a relatively compact surface, comprising frame structure equipped with wheels for rollingly supporting said apparatus upon such surface, a casing mounted upon said frame structure and defining a relatively large enclosure therewithin open at its forward end to permit ingress of air and litter thereinto and equipped adjacent its rear end with screen structure effective to retain litter within said enclosure while permitting egress of air therefrom, accumulator structure carried by said apparatus adjacent the forward end thereof for directing litter toward a restricted location adjacent the open end of said enclosure, blower mechanism supported by said frame structure for directing an air stream toward such restricted location to carry litter thereat into said enclosure, an auxiliary blower supported by said frame structure adjacent the forward end of said casing for directing an auxiliary air stream laterally therefrom toward any curbing along such compact surface so as to dislodge from such curbing any litter adjacent thereto, and support means for said auxiliary blower permitting adjustment thereof in longitudinal directions for selective movement forwardly of said accumulator structure during operation of said auxiliary blower.

5. The apparatus of claim 4 in which said accumulator structure includes a pair of angularly disposed collector members converging inwardly toward the rear of said frame structure and extending downwardly therefrom toward proximity with such compact surface, each of said angularly disposed collector members being equipped with a depending relatively flexible seal adapted to be brought into substantially contiguous relation with such compact surface during operation of said apparatus, and means for selectively displacing said frame structure in vertical directions relative to said wheels so as to lower said angularly disposed collector members and bring said seals thereof into such contiguous relation with such compact surface during operation of said apparatus and to elevate said collector members and displace said seals from such compact surface when said apparatus is not in operation.

6. The apparatus of claim 5 in which said casing is provided with a rear wall and with a top wall, in which said screen structure comprises a part of each of said rear and top walls, and further comprising baffle means mounted within said enclosure to facilitate release of litter from such air stream by impingement of the litter-entrained air stream with said baffle means.

7. The apparatus of claim 6 in which said casing is provided with a bottom wall having a relatively large V-shaped opening therein adjacent the forward end of said enclosure, in which said angularly disposed collector members are located along the edges of said V-shaped opening, the aforesaid restricted location being intermediate said collector members toward the vertex thereof, and in which said blower mechanism is supported above said bottom wall and is angularly disposed with respect to the longitudinal axis of said apparatus so as to direct an air stream downwardly and rearwardly toward the vertex of said V-shaped opening and said angularly disposed collector members extending along the respective edges thereof.

References Cited
UNITED STATES PATENTS

| | | | |
|---|---|---|---|
| 1,007,800 | 11/1911 | Rowbotham | 15—346X |
| 1,514,248 | 11/1924 | Bergman | 15—340UX |
| 1,663,364 | 3/1928 | Adams | 15—354 |
| 2,542,024 | 2/1951 | George et al. | 15—354 |
| 2,990,019 | 6/1961 | Finn | 15—345X |

FOREIGN PATENTS

| | | | |
|---|---|---|---|
| 797,833 | 7/1958 | Great Britain | 15—345 |

ROBERT W. MITCHELL, Primary Examiner

U.S. Cl. X.R.

15—354, 405